(12) United States Patent
Miyahara

(10) Patent No.: US 12,112,079 B2
(45) Date of Patent: Oct. 8, 2024

(54) IMAGE PROCESSING APPARATUS AND IMAGE PROCESSING SYSTEM

(71) Applicant: CANON KABUSHIKI KAISHA, Tokyo (JP)

(72) Inventor: Nobuaki Miyahara, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/677,796

(22) Filed: Feb. 22, 2022

(65) Prior Publication Data

US 2022/0276813 A1 Sep. 1, 2022

(30) Foreign Application Priority Data

Feb. 26, 2021 (JP) ................................ 2021-030075

(51) Int. Cl.
*G06F 3/12* (2006.01)
(52) U.S. Cl.
CPC .......... *G06F 3/1208* (2013.01); *G06F 3/1242* (2013.01); *G06F 3/1256* (2013.01)
(58) Field of Classification Search
CPC .... G06F 3/1208; G06F 3/1242; G06F 3/1256; G06F 3/1285; H04N 1/00029; H04N 1/00005; H04N 1/00047; H04N 1/0005; H04N 1/00063; H04N 1/00087
USPC ...................................................... 358/1.14
See application file for complete search history.

(56) References Cited

U.S. PATENT DOCUMENTS

| | | | |
|---|---|---|---|
| 2004/0190057 A1* | 9/2004 | Takahashi | G06F 3/1205 358/1.15 |
| 2010/0021188 A1* | 1/2010 | Mizumukai | G03G 15/1605 399/31 |
| 2010/0053679 A1* | 3/2010 | Okada | H04N 1/00925 358/1.15 |
| 2010/0053680 A1* | 3/2010 | Sato | G03G 15/50 358/1.15 |
| 2015/0221077 A1* | 8/2015 | Kawabata | G06T 7/337 382/141 |
| 2015/0343812 A1* | 12/2015 | Yoshida | B41J 11/0005 347/9 |
| 2020/0050907 A1* | 2/2020 | Ishii | G06K 15/1878 |

FOREIGN PATENT DOCUMENTS

JP 2019095476 A 6/2019

* cited by examiner

*Primary Examiner* — Darryl V Dottin
(74) *Attorney, Agent, or Firm* — Canon U.S.A., Inc. IP Division

(57) ABSTRACT

An image processing apparatus that comprises a printer configured to print image data on a print medium based on a print setting and a storage device and compares reference image data and the image data printed on the print medium, includes a controller having one or more processors which execute instructions stored in one or more memories, the controller being configured to execute layout processing for laying out the image data based on the print setting, and store the image data subjected to the layout processing as the reference image data in the storage device.

19 Claims, 10 Drawing Sheets

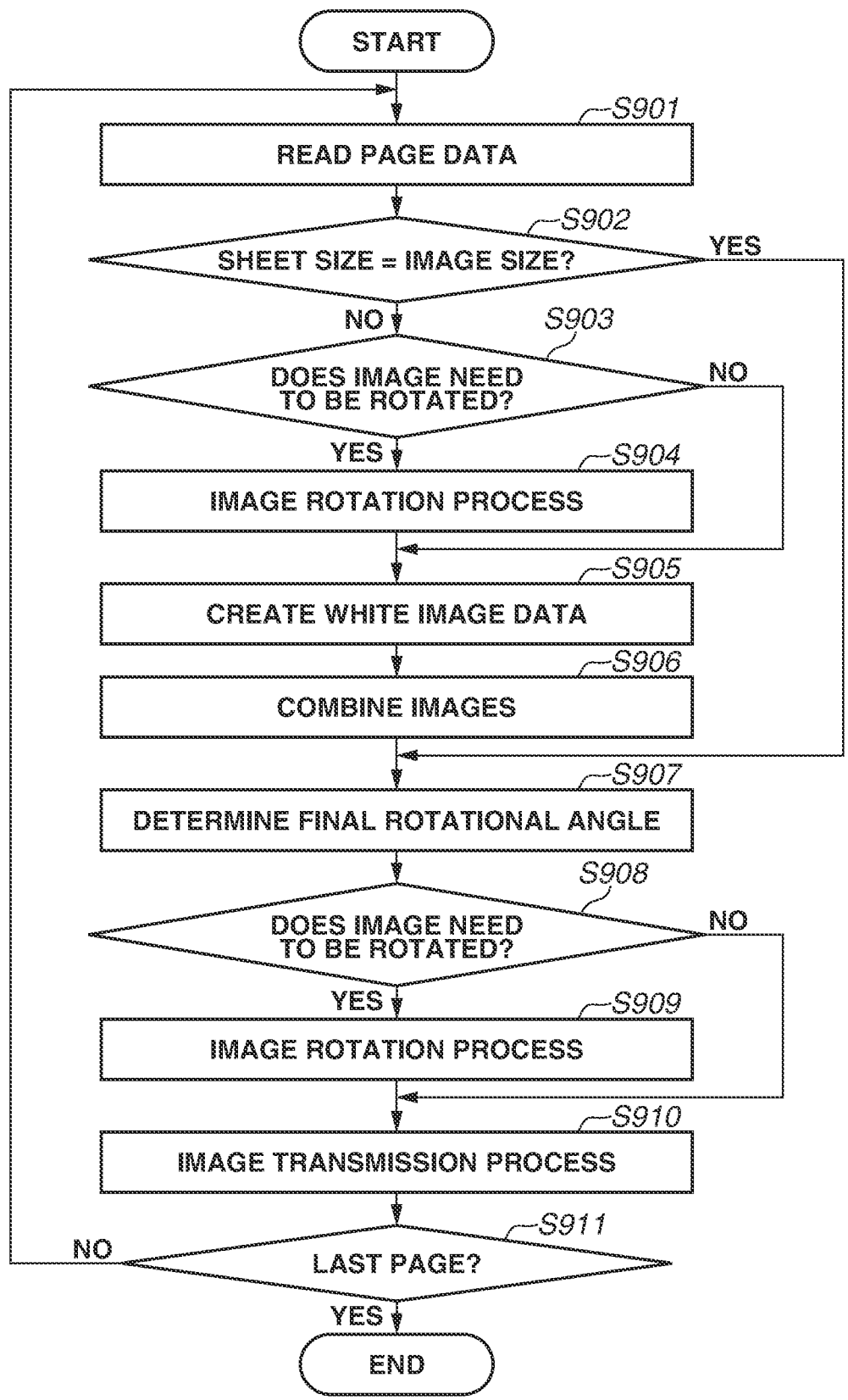

IMAGE PROCESSING APPARATUS AND IMAGE PROCESSING SYSTEM

BACKGROUND

Field of the Disclosure

The present disclosure relates to an image processing apparatus and an image processing system.

Description of the Related Art

In recent years, the following printing system has been known. While a sheet on which an image is printed by a printing apparatus is conveyed, a product inspection apparatus can inspect the sheet. In inspection of the printed sheet, first, the product inspection apparatus reads an image on the conveyed printed sheet and registers the read image as a reference image. Next, the product inspection apparatus analyzes an image on an output product (print sheet) of an executed print job and compares the analyzed image with the reference image, thereby determining whether the print sheet is normal. As a result of the inspection by the product inspection apparatus, for example, a lack of a barcode or a ruled line, image missing, printing dirt, page missing, or color shift can be detected.

A product inspection system has a configuration in which an image to be inspected is printed in advance, and an image obtained by a product inspection apparatus reading the printed image is registered as a reference image in the product inspection apparatus. In the product inspection system having such a configuration, however, a sheet on which an image is printed is read in registering the reference image. Thus, an operator needs to visually check whether an output sheet on which an image is printed or a read image is appropriate as the reference image. If there are a large number of pages, an amount of checking work of the operator becomes large. Thus, the checking may take time, or an operational error may occur. To solve such an issue, the following product inspection system is known. The product inspection system has a configuration in which processing of cancelling out an amount of adjustment that has been made in image processing performed on raster data is performed when a raster image processor (RIP) image is inspected, thereby acquiring image data of a reference image, and the image data is set as the reference image in a product inspection apparatus (Japanese Patent Application Laid-Open No. 2019-95476).

SUMMARY

According to embodiments of the present disclosure, an image processing apparatus that comprises a printer configured to print image data on a print medium based on a print setting and a storage device and compares reference image data and the image data printed on the print medium, includes a controller having one or more processors which execute instructions stored in one or more memories, the controller being configured to execute layout processing for laying out the image data based on the print setting, and store the image data subjected to the layout processing as the reference image data in the storage device.

Further features of the present disclosure will become apparent from the following description of exemplary embodiments with reference to the attached drawings.

BRIEF DESCRIPTION OF THE DRAWINGS

FIG. 9 is a flowchart illustrating a procedure of creation and registration of a reference image.

DESCRIPTION OF THE EMBODIMENTS

With reference to the attached drawings, exemplary embodiments of the present disclosure will be described in detail. The following exemplary embodiments do not limit the disclosure, and not all the combinations of the features described in the exemplary embodiments are essential for a method for solving the issues in the present disclosure. An external controller according to the present exemplary embodiment may also be referred to as an image processing controller, a digital front end (DFE), or a print server. An image forming apparatus according to the present exemplary embodiment may also be referred to as a multifunction peripheral (MFP).

Figure 1:
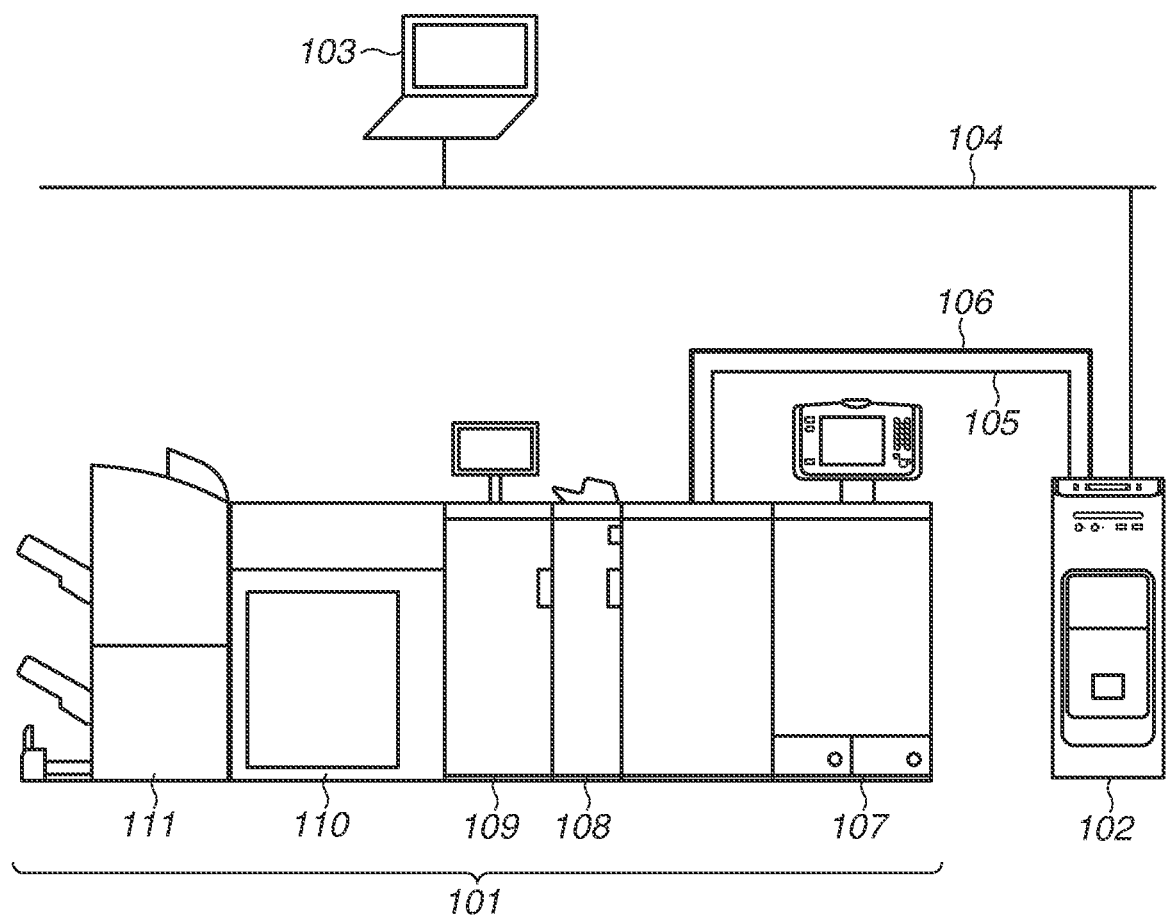
FIG. 1 is a diagram illustrating an entire hardware configuration of a printing system.

FIG. 1 is a diagram illustrating an entire hardware configuration of an image processing system according to a first exemplary embodiment. The image processing system includes an image forming apparatus 101 and an external controller 102. The image forming apparatus 101 and the external controller 102 are communicably connected via an internal local area network (LAN) 105 and a video cable 106. The external controller 102 is communicably connected to a personal computer (PC) 103 via an external LAN 104. The PC 103 gives a print instruction to the external controller 102.

On the PC 103, a printer driver having a function of converting print data into a print description language that can be processed by the external controller 102 is installed. A user who performs printing can issue a print instruction via the printer driver from various applications. Based on the print instruction from the user, the printer driver transmits print data to the external controller 102. If the external controller 102 receives the print instruction from the PC 103, the external controller 102 performs data analysis and rasterization processing on the print data, inputs the print data to the image forming apparatus 101, and issues a print instruction to the image forming apparatus 101. The external controller 102 inputs the print data to the image forming apparatus 101 via the internal LAN 105 and inputs rasterized image data via the video cable 106.

Next, the image forming apparatus 101 is described. To the image forming apparatus 101, a plurality of apparatuses having different functions is connected, and the image forming apparatus 101 is configured to perform complex print processing such as bookbinding.

A printing apparatus 107 forms an image using toner on a sheet conveyed from a sheet feeding unit in a lower portion of the printing apparatus 107. While a description is provided herein using a sheet as an example, any print medium other than a sheet may also be used.

The configuration and the operating principle of the printing apparatus 107 are as follows. The printing apparatus 107 reflects a light beam such as laser light modulated depending on image data, by a rotary polygon mirror (polygon mirror) and irradiates a photosensitive drum with the reflected laser light as scanning light.

An electrostatic latent image formed on the photosensitive drum by the laser light is developed using toner, and a developed toner image is transferred to a sheet attached to a transfer drum. The printing apparatus 107 sequentially executes a series of image formation processes using toner of yellow (Y), magenta (M), cyan (C), and black (K), thereby forming a full-color image on the sheet. The sheet on the transfer drum on which the full-color image is formed is conveyed to a fixing device. The fixing device includes a roller and a belt and includes a heat source such as a halogen heater built in the roller. The fixing device melts, by heat and pressure, the toner on the sheet to which the toner image is transferred, thereby fixing the toner to the sheet. An inserter 108 is an apparatus that inserts insertion sheet. The inserter 108 can insert a sheet at any position into a group of sheets on which images are printed by the printing apparatus 107 and which is conveyed.

A product inspection apparatus 109 is an apparatus that reads an image on a conveyed sheet (print product) and compares generated image data with reference image data registered in advance, thereby determining whether the printed image is normal. Print products subjected to determination on whether the printed image is normal are separated, for example, into a normal print product and a print product in which an error has occurred, and then discharged.

A large-capacity stacker 110 is an apparatus that can stack a large number of sheets. A finisher 111 is an apparatus that performs finishing processing on a conveyed sheet. The finisher 111 can perform the finishing processing such as stapling, punching, or saddle stitch bookbinding depending on settings, and discharges the sheet to a sheet discharge tray.

A printing system described with reference to FIG. 1 has a configuration in which the external controller 102 is connected to the image forming apparatus 101. The present disclosure, however, is not limited to the configuration in which the external controller 102 is connected.

More specifically, a configuration may be employed in which the image forming apparatus 101 is connected to the external LAN 104, and the PC 103 transmits print data that can be processed by the image forming apparatus 101 to the image forming apparatus 101. In this case, the image forming apparatus 101 performs the data analysis and the rasterization processing on the print data and executes print processing on the resulting print data.

Figure 2:
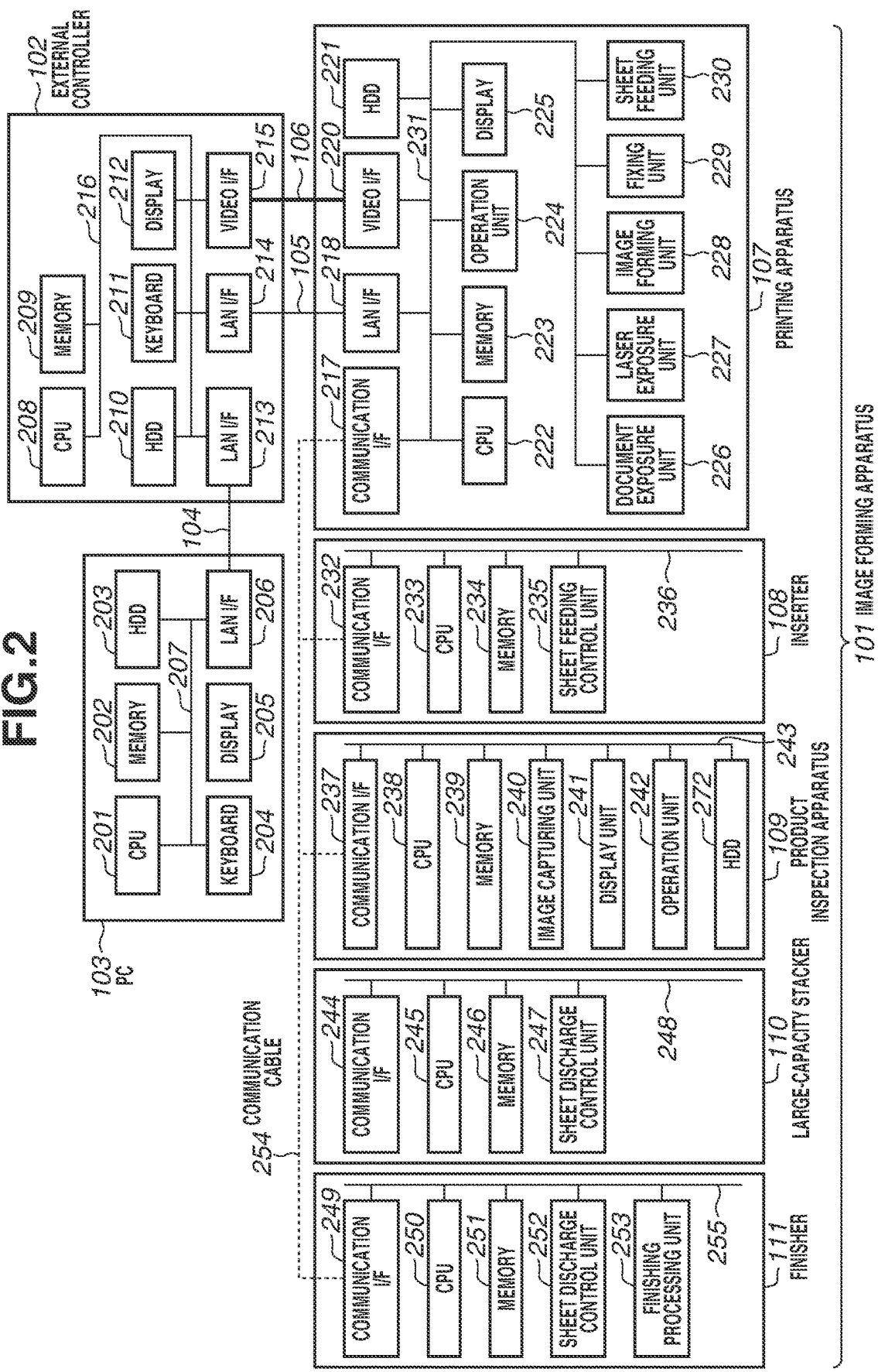
FIG. 2 is a block diagram illustrating a system configuration of the printing system.

FIG. 2 is a block diagram illustrating a system configuration of the image forming apparatus 101, the external controller 102, and the PC 103.

First, a configuration of the printing apparatus 107 of the image forming apparatus 101 is described. The printing apparatus 107 of the image forming apparatus 101 includes a communication interface (I/F) 217, a LAN I/F 218, a video I/F 220, a hard disk drive (HDD) 221, a central processing unit (CPU) 222, a memory 223, an operation unit 224, and a display 225. The printing apparatus 107 of the image forming apparatus 101 further includes a document exposure unit 226, a laser exposure unit 227, an image forming unit 228, a fixing unit 229, and a sheet feeding unit 230. These components are connected via a system bus 231.

The communication I/F 217 is connected to the inserter 108, the product inspection apparatus 109, the large-capacity stacker 110, and the finisher 111 via a communication cable 254, and communication for control of each of the apparatuses is performed via the communication I/F 217.

The LAN I/F 218 is connected to the external controller 102 via the internal LAN 105, and print data is communicated via the LAN I/F 218.

The video I/F 220 is connected to the external controller 102 via the video cable 106, and rasterized image data is communicated via the video I/F 220.

The HDD 221 is a storage device that stores programs and data. Based on the programs stored in the HDD 221, the CPU 222 comprehensively controls image processing and printing. The memory 223 stores programs necessary for the CPU 222 to perform various types of processing and image data and operates as a work area.

The operation unit 224 receives inputs of various settings and an instruction to perform an operation from the user. The display 225 displays setting information regarding the image forming apparatus 101 and a processing status of a print job. The document exposure unit 226 performs processing of reading a document when a copy function or a scan function is used.

The document exposure unit 226 captures an image using a charge-coupled device (CCD) camera while illuminating a sheet placed by the user with an exposure lamp, thereby reading document data.

The laser exposure unit 227 is a device that performs primary charging for irradiating the photosensitive drum with laser light to transfer a toner image, and laser exposure. First, the laser exposure unit 227 performs the primary charging for charging a surface of the photosensitive drum to a uniform negative potential. Next, a laser driver irradiates the photosensitive drum with laser light while adjusting an angle of reflection using a polygon mirror. This neutralizes a negative charge of an irradiated portion, thereby an electrostatic latent image is formed. The image forming unit 228 is a device that transfers toner to the sheet. The image forming unit 228 includes a developing unit, a transfer unit, and a toner supply unit. The image forming unit 228 transfers toner on the photosensitive drum to the sheet.

The developing unit attaches negatively charged toner to an electrostatic latent image on the surface of the photosensitive drum from a developing cylinder, thereby visualizing the image. The transfer unit performs a primary transfer for applying a positive potential to a primary transfer roller and transferring toner on the surface of the photosensitive drum to a transfer belt, and a secondary transfer for applying a positive potential to a secondary transfer outer roller and transferring the toner on the transfer belt to the sheet. The fixing unit 229 is a device that melts toner on the sheet and firmly fixes the toner to the sheet by heat and pressure. The fixing unit 229 includes a heater, a fixing belt, and a pressure belt. The sheet feeding unit 230 is a device that feeds the sheet. Rollers and various sensors control a sheet feeding operation and a sheet conveying operation.

Next, a configuration of the inserter 108 of the image forming apparatus 101 is described. The inserter 108 of the image forming apparatus 101 includes a communication I/F 232, a CPU 233, a memory 234, and a sheet feeding control unit 235. The components are connected via a system bus 236. The communication I/F 232 is connected to the printing apparatus 107 via the communication cable 254, and communication necessary for control is performed via the communication I/F 232. Based on a control program stored in the memory 234, the CPU 233 performs various types of control necessary for feeding of a sheet. The memory 234 is a storage device that stores the control program. Based on an instruction from the CPU 222, the sheet feeding control unit 235 controls a roller and a sensor and controls the feeding and conveyance of a sheet conveyed from a sheet feeding unit of the inserter 108 or the printing apparatus 107.

Then, a configuration of the product inspection apparatus 109 of the image forming apparatus 101 is described. The product inspection apparatus 109 of the image forming apparatus 101 includes a communication I/F 237, a CPU 238, a memory 239, an image capturing unit 240, a display unit 241, an operation unit 242, and an HDD 272. The components are connected via a system bus 243. The communication I/F 237 is connected to the printing apparatus 107 via the communication cable 254, and communication necessary for control is performed via the communication I/F 237.

A reference image to be used in inspection is also received from the printing apparatus 107 via the communication cable 254 and the communication I/F 237 and stored in the HDD 272. Based on a control program stored in the memory 239, the CPU 238 performs various types of control necessary for product inspection. The memory 239 is a storage device that stores the control program.

Based on an instruction from the CPU 238, the image capturing unit 240 captures an image on a conveyed sheet. The CPU 238 compares the image captured by the image capturing unit 240 with the reference image stored in the HDD 272, thereby determining whether the printed image is normal. The display unit 241 displays a result of product inspection and a setting screen. The operation unit 242 is operated by the user and receives a change in the setting of the product inspection apparatus 109 or an instruction to register the reference image. The HDD 272 stores the reference image.

In a case where the HDD 272 is not disposed, a configuration may be employed in which the reference image is stored in the HDD 221, and when processing of determining whether the printed image is normal is performed, the reference image is read from the HDD 221 to the memory 239 and used.

Then, a configuration of the large-capacity stacker 110 of the image forming apparatus 101 is described. The large-capacity stacker 110 of the image forming apparatus 101 includes a communication I/F 244, a CPU 245, a memory 246, and a sheet discharge control unit 247. The components are connected via a system bus 248. The communication I/F 244 is connected to the printing apparatus 107 via the communication cable 254, and communication necessary for control is performed via the communication I/F 244. Based on a control program stored in the memory 246, the CPU 245 performs various types of control necessary for discharge of a sheet. The memory 246 is a storage device that stores the control program. Based on an instruction from the CPU 245, the sheet discharge control unit 247 performs control to convey a conveyed sheet to a stack tray, an escape tray, or the finisher 111 at a subsequent stage.

Then, a configuration of the finisher 111 of the image forming apparatus 101 is described. The finisher 111 of the image forming apparatus 101 includes a communication I/F 249, a CPU 250, a memory 251, a sheet discharge control unit 252, and a finishing processing unit 253. The components are connected via a system bus 255. The communication I/F 249 is connected to the printing apparatus 107 via the communication cable 254, and communication necessary for control is performed via the communication I/F 249. Based on a control program stored in the memory 251, the CPU 250 performs various types of control necessary for finishing and the discharge of a sheet. The memory 251 is a storage device that stores the control program. Based on an instruction from the CPU 250, the sheet discharge control unit 252 controls the conveyance and the discharge of a sheet. Based on an instruction from the CPU 250, the finishing processing unit 253 controls finishing processing such as stapling, punching, or saddle stitch bookbinding.

Then, a configuration of the external controller 102 is described. The external controller 102 includes a CPU 208, a memory 209, an HDD 210, a keyboard 211, a display 212, a LAN I/F 213, a LAN I/F 214, and a video I/F 215. The components are connected via a system bus 216. Based on programs and data stored in the HDD 210, the CPU 208 comprehensively executes processing of receiving print data from the PC 103, raster image processor (RIP) processing, and processing of transmitting print data to the image forming apparatus 101.

The memory 209 stores programs necessary for the CPU 208 to perform various types of processing and data and operates as a work area. The HDD 210 stores a program necessary for operation of printing processing and data. The keyboard 211 is a device for a user to input an operation instruction to the external controller 102. The display 212 displays information regarding an application executed by the external controller 102 using a video signal of a still image or a moving image. The LAN I/F 213 is connected to the PC 103 via the external LAN 104, and a print instruction is communicated via the LAN I/F 213. The LAN I/F 214 is connected to the image forming apparatus 101 via the internal LAN 105, and print data is communicated as a print instruction via the LAN I/F 214. The video I/F 215 is connected to the image forming apparatus 101 via the video cable 106, and rasterized image data is communicated via the video I/F 215.

Then, the configuration of the PC 103 is described. The PC 103 includes a CPU 201, a memory 202, an HDD 203, a keyboard 204, a display 205, and a LAN I/F 206. The components are connected via a system bus 207. Based on a document processing program stored in the HDD 203, the CPU 201 creates print data or issues a print instruction.

The CPU 201 comprehensively controls the devices connected to the system bus 207. The memory 202 stores programs necessary for the CPU 201 to perform various types of processing and data and operates as a work area. The HDD 203 stores a program necessary for operation of printing processing and data. The keyboard 204 is a device for the user to input an operation instruction to the PC 103. The display 205 displays information regarding an application executed by the PC 103 using a video signal of a still image or a moving image. The LAN I/F 206 is connected to the external LAN 104, and a print instruction is communicated via the LAN I/F 206.

In the above description, while the external controller 102 and the image forming apparatus 101 are connected to the internal LAN 105 and the video cable 106, any configuration may be employed as long as data necessary for printing can be transmitted and received. For example, a configuration may be employed in which the external controller 102 and the image forming apparatus 101 are connected to only the video cable 106. Each of the memories 202, 209, 223, 234, 239, 246, and 251 may be any storage device for holding data and a program. For example, a configuration may be employed in which each of the memories 202, 209, 223, 234, 239, 246, and 251 is substituted by a volatile random-access memory (RAM), a non-volatile read-only memory (ROM), a built-in HDD, an external HDD, or a Universal Serial Bus (USB) memory.

Figure 3:
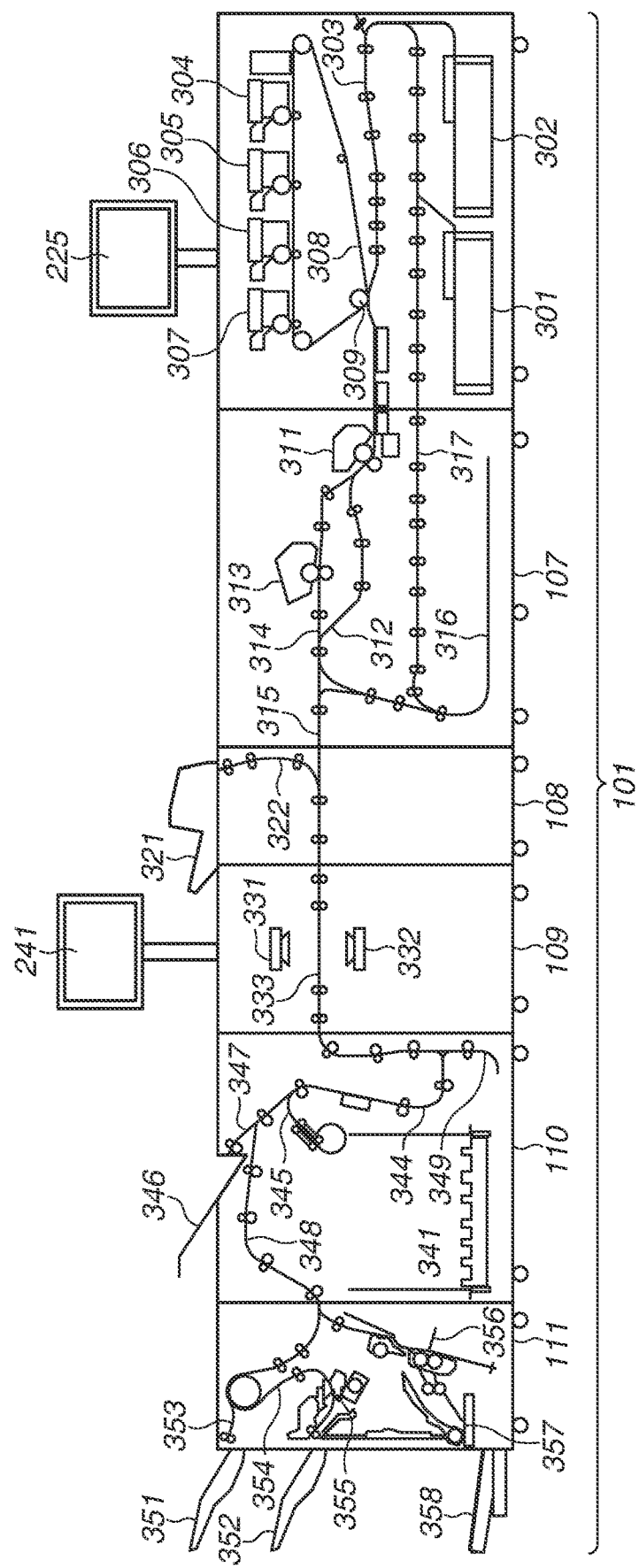
FIG. 3 is a schematic diagram illustrating a mechanical cross-sectional view of an image forming apparatus.

FIG. 3 is a mechanical cross-sectional view of the image forming apparatus 101. The printing apparatus 107 forms an image to be printed on a sheet. Sheet feeding decks 301 and 302 can store various sheets. To each of the sheet feeding decks 301 and 302, information regarding the sheets (the sheet size and the sheet type) stored therein can be set from the operation unit 224 of the printing apparatus 107.

Each of the sheet feeding decks 301 and 302 can separate the topmost sheet among the stored sheets and convey the separated sheet to a sheet conveying path 303. Development stations 304 to 307 form toner images using colored toner of Y, M, C, and K, respectively, to form a color image. The toner images formed at this time are primarily transferred to an intermediate transfer belt 308. The intermediate transfer belt 308 rotates clockwise in FIG. 3 and transfers the toner images to the sheet conveyed from the sheet conveying path 303 at a secondary transfer position 309.

The display 225 displays a print status of the image forming apparatus 101 or information for the settings of the image forming apparatus 101. A fixing unit 311 fixes the toner images to the sheet. The fixing unit 311 includes a pressure roller and a heating roller. The sheet passes between the rollers, whereby the fixing unit 311 melts and pressure-bonds the toner and fixes the toner images to the sheet. The sheet having come out of the fixing unit 311 passes through a sheet conveying path 312 and is conveyed to a sheet conveying path 315.

If the toner needs to be further melted and pressure-bonded to fix the toner depending on the type of sheet, after the sheet passes through the fixing unit 311, the sheet is conveyed to a second fixing unit 313 using an upper sheet conveying path. After the toner is additionally melted and pressure-bonded by the second fixing unit 313, the sheet passes through a sheet conveying path 314 and is conveyed to the sheet conveying path 315. If the image formation mode is set to two-sided printing, the sheet is conveyed to a sheet reverse path 316, reversed in the sheet reverse path 316, and then conveyed to a two-sided conveying path 317. Then, an image is transferred to a second surface of the sheet at the secondary transfer position 309.

The inserter 108 inserts an insertion sheet. The inserter 108 includes an inserter tray 321 and causes a sheet fed to the inserter tray 321 to join the conveying path via a sheet conveying path 322. Consequently, it is possible to insert a sheet at any position into a series of sheets conveyed from the printing apparatus 107 and convey the sheets to a subsequent apparatus.

The sheet having passed through the inserter 108 is conveyed to the product inspection apparatus 109. In the product inspection apparatus 109, cameras 331 and 332 are placed opposed to each other. The camera 331 is a camera that reads the upper surface of the sheet, and the camera 332 is a camera that reads the lower surface of the sheet. At the timing when the sheet conveyed to a sheet conveying path 333 reaches a predetermined position, the product inspection apparatus 109 can read an image on the sheet using the camera 331 or 332 and determine whether the image on the sheet is normal. The display unit 241 displays a result of product inspection performed by the product inspection apparatus 109.

The large-capacity stacker 110 can stack a large number of sheets.

The large-capacity stacker 110 includes a stack tray 341 as a tray on which a sheet determined as a normal sheet (print product) by the product inspection apparatus 109 is stacked. The sheet having passed through the product inspection apparatus 109 is input to the large-capacity stacker 110 through a sheet conveying path 344. The sheet is conveyed on the sheet conveying path 344, passes through a sheet conveying path 345, and is stacked on the stack tray 341.

Further, the large-capacity stacker 110 includes an escape tray 346 as a sheet discharge tray. The escape tray 346 is a sheet discharge tray used to discharge a sheet determined as a sheet (print product) in which an error has occurred by the product inspection apparatus 109. To output the sheet to the escape tray 346, the sheet is conveyed on the sheet conveying path 344, passes through a sheet conveying path 347, and is conveyed to the escape tray 346. To convey the sheet to a post-processing apparatus at a subsequent stage of the large-capacity stacker 110, the sheet is conveyed via a sheet conveying path 348. A reverse unit 349 reverses the sheet. The reverse unit 349 is used to stack the sheet on the stack tray 341.

To stack the sheet on the stack tray 341 so that the direction of the sheet when the sheet is input to the large-capacity stacker 110 and the direction of the sheet when the sheet is output are the same, the sheet is reversed once by the reverse unit 349. To stack the sheet on the escape tray 346 or convey the sheet to the post-processing apparatus at the subsequent stage, the sheet is discharged as it is without being flipped. Thus, the operation of reversing the sheet in the reverse unit 349 is not performed.

The finisher 111 is an apparatus that performs finishing processing on the conveyed sheet based on a function specified by the user. Specifically, the finisher 111 has a finishing function such as stapling (one-point or two-point binding), punching (two holes or three holes), or saddle stitch bookbinding. The finisher 111 includes sheet discharge trays 351 and 352. The sheet is output to the sheet discharge tray 351 via a sheet conveying path 353. In the sheet conveying path 353, however, finishing processing such as the stapling cannot be performed.

To perform the finishing processing such as the stapling, the sheet is conveyed via a sheet conveying path 354, and a finishing function specified by the user is executed on the sheet by a processing unit 355. Then, the sheet is output to the sheet discharge tray 352. Each of the sheet discharge trays 351 and 352 can be lifted and lowered. Thus, finisher 111 can also operate so that the sheet discharge tray 351 is lowered and the sheet subjected to the finishing processing by the processing unit 355 is stacked on the sheet discharge tray 351. If the saddle stitch bookbinding is specified, after a saddle stitch processing unit 356 performs stapling processing on the center of the sheet, the sheet is folded into two and output to a saddle stitch bookbinding tray 358 via a sheet conveying path 357. The saddle stitch bookbinding tray 358 includes a conveyor belt and is configured to convey a saddle stitch bookbinding bundle stacked on the saddle stitch bookbinding tray 358 to the left.

Figure 4:
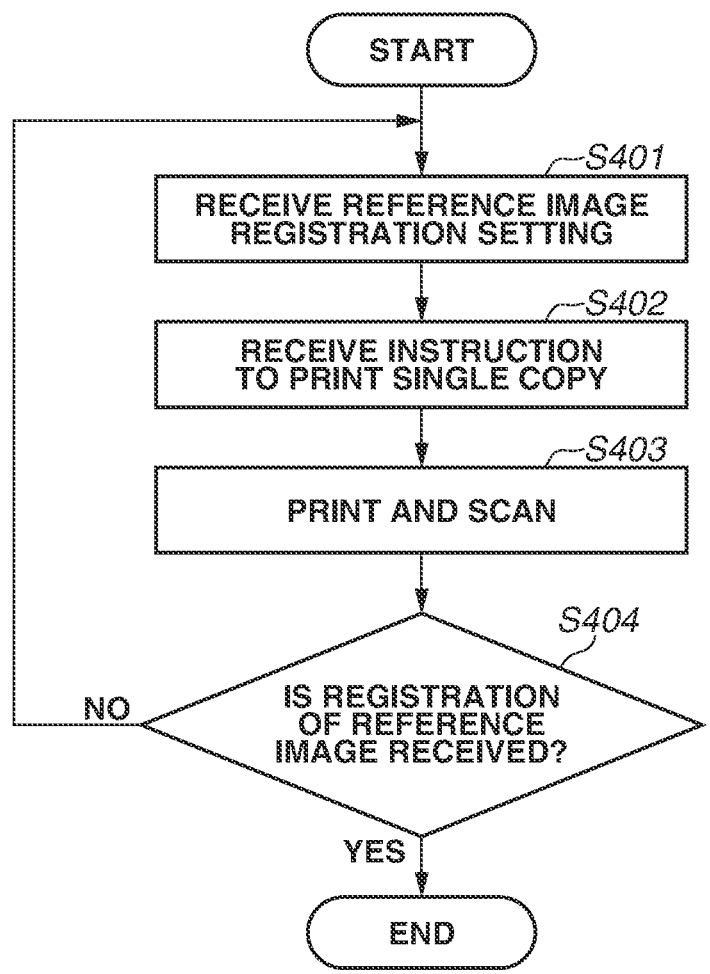
FIG. 4 is a flowchart illustrating a procedure of conventional reference image registration.

FIG. 4 is a flowchart illustrating a procedure of conventional reference image registration.

With the system configuration illustrated in FIG. 2, a print product printed by the image forming apparatus 101 is inspected. In the inspection, a reference image is registered in advance in the HDD 272 of the product inspection apparatus 109, an image on a sheet is read using the camera 331 or 332 when printing is performed, and the image on the sheet is compared with the reference image, thereby whether the image on the sheet is normal is determined. Conventionally, printing has actually been performed also when the reference image is registered, and an image obtained by reading an image on a sheet using the camera 331 or 332 has been registered as the reference image in the HDD 272.

In step S401, the image forming apparatus 101 receives the setting mode of the product inspection apparatus 109 set by an operator from the operation unit 242. Consequently, the product inspection apparatus 109 switches to a reference image registration mode. In the conventional registration mode, since an image on a sheet read using the camera 331 or 332 is registered as a reference image, the product inspection apparatus 109 enters a standby state where the product inspection apparatus 109 waits for a sheet to be conveyed to the sheet conveying path 333.

In step S402, the image forming apparatus 101 receives a print instruction from the PC 103. The print instruction received at this time is an instruction to print a single copy of a print job that the operator wishes to inspect.

In step S403, the image forming apparatus 101 executes the print job, thereby printing image data on a sheet. Further, using the camera 331 or 332, the image forming apparatus 101 reads the image on the sheet on which the image data has been printed. Then, the image forming apparatus 101 saves the read image in the HDD 272. The operator visually checks the sheet subjected to print output or an image preview displayed on the display unit 241 and confirms whether the read image is appropriate as the reference image.

In step S404, if the registration of the reference image is received (YES in step S404), the processing ends. If, on the other hand, the registration of the reference image is not received (NO in step S404), the processing returns to step S401. At this time, the operator cleans the image forming apparatus 101 or changes the settings of the print job so that an image corresponding to a sheet subjected to print output or an image preview displayed on the display unit 241 can be registered as the reference image. Steps S401 to S404 are repeated until the apparatus thus receives the registration of the reference image.

In the conventional reference image registration, printing is actually performed, and the reference image is input by the same input method as that of an inspection image. Thus, it is not necessary to take into account the sizes and the directions of the images, and it is possible to perform inspection by simply comparing the images. However, in a case where a print job has a large number of pages, the operator needs to visually determine whether all the pages are appropriate as reference images. Thus, a checking error may occur, or checking may take time.

Figure 5:
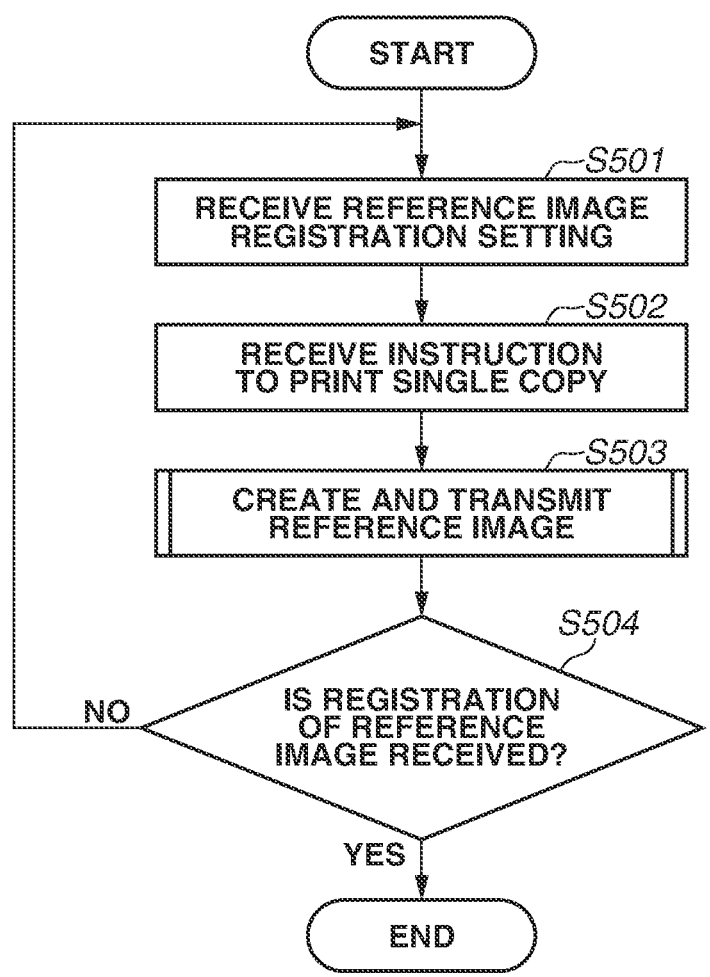
FIG. 5 is a flowchart illustrating a procedure of reference image registration according to the present exemplary embodiment.

FIG. 5 is a flowchart illustrating a procedure of reference image registration according to the present exemplary embodiment.

In the present exemplary embodiment, when a reference image is registered, a print sheet is not read as illustrated in FIG. 4, but image data created from rasterized image data (raster data) is registered. In the present exemplary embodiment, an example is illustrated where the rasterized image data is received from the external controller 102 via the video cable 106. The present disclosure, however, is not limited to this example. For example, the image forming apparatus 101 may receive a print job (e.g., including page description language (PDL) data) from the PC 103 and rasterize image data.

In step S501, the image forming apparatus 101 receives a setting instruction to set reference image data in the product inspection apparatus 109 issued by the operator from the operation unit 242. Consequently, the product inspection apparatus 109 switches to the reference image registration mode. The product inspection apparatus 109 waits for rasterized image data to be input from the external controller 102 via the video cable 106.

In step S502, the image forming apparatus 101 receives a print instruction from the PC 103. The print instruction includes at least print settings including the sheet size of a sheet on which printing is to be performed, the resolution, orientation of an image, and the image size of each page, and image data. The instruction received at this time is an instruction to print a single copy of a print job that the operator wishes to inspect. In the present exemplary embodiment, the print instruction is received so that the operability in the present exemplary embodiment matches the operability of the conventional method. Alternatively, an instruction to register a print job as a reference image registration job may be received from the PC 103.

In step S503, the image forming apparatus 101 performs layout processing for applying a layout appropriate for printing on the image data input from the external controller 102 via the video cable 106, and then transmits the resulting image data to the product inspection apparatus 109 via the communication cable 254. The product inspection apparatus 109 stores the image data as a reference image in the HDD 272.

The details of the processing of step S503 are illustrated in FIG. 9. In step S504, if the registration of the reference image is received (YES in step S504), the processing ends while the reference image stored in the HDD 272 in step S503 remains in the HDD 272.

If, on the other hand, the registration of the reference image is not received (NO in step S504), the image forming apparatus 101 deletes the reference image stored in the HDD 272, and the processing returns to step S501. At this time, the operator cleans the image forming apparatus 101 or changes the settings of the print job so that an image corresponding to a sheet subjected to print output or an image preview displayed on the display unit 241 can be registered as the reference image. Steps S501 to S504 are repeated until the apparatus thus receives the registration of the reference image.

In step S503, the reference image is stored in the HDD 272. Alternatively, the reference image may be stored in the memory 239. In this case, if the registration of the reference image is received in step S504, the product inspection apparatus 109 stores, in the HDD 272, the reference image stored in the memory 239. If the registration of the reference image is not received in step S504, the product inspection apparatus 109 does not store, in the HDD 272, the reference image stored in the memory 239.

Next, with reference to FIGS. 6 to 10B, a description is given of details of the processing of creating and transferring a reference image that is performed in step S503. First, with reference to FIG. 6, a relationship between image data to be printed on a sheet and a margin is described.

Figure 6:
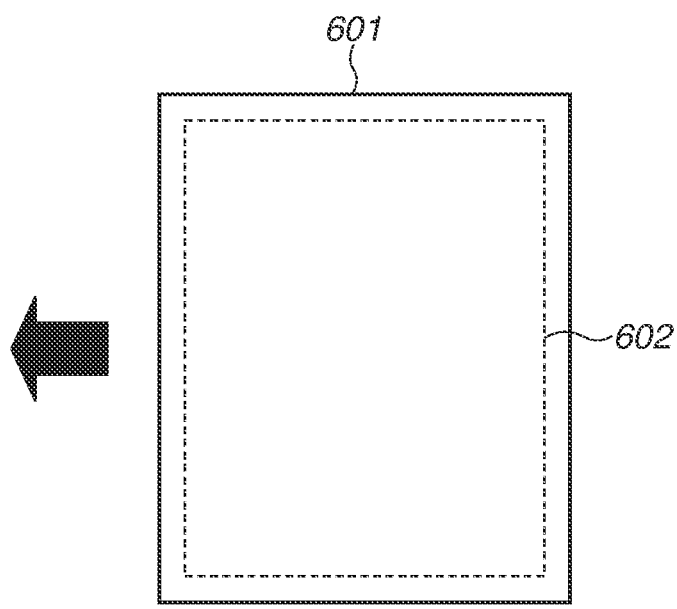
FIG. 6 is a diagram illustrating margins of a sheet on which printing is to be performed by the image forming apparatus.

FIG. 6 is a diagram illustrating margins of a sheet on which printing is to be performed by the image forming apparatus 101. A sheet 601 is a sheet on which image data is to be printed, and is conveyed in a direction of an arrow. The inside of a dashed line 602 is an area where an image is to be actually printed by the image forming apparatus 101, and the outside of the dashed line 602 is an area where an image is not to be printed. Thus, in a case where the image forming apparatus 101 receives image data corresponding to the sheet size of the sheet 601 from the external controller 102, even if there is an image in the area outside the dashed line 602, the image is not printed in the area.

In the present exemplary embodiment, the margins have the same width on the top, bottom, left, and right. However, depending on the configuration of the image forming apparatus 101, a configuration is also possible in which, if a printable area is different between the leading edge and the trailing edge or between the far side and the near side of the sheet with respect to the conveying direction, the margins may have different widths on the top, bottom, left, and right.

Figure 7A:
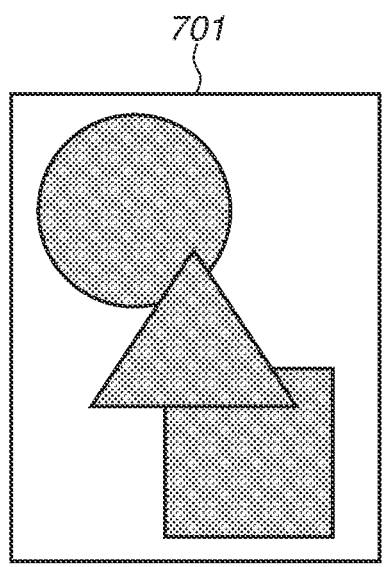
FIGS. 7A, 7B, and 7C are diagrams illustrating a relationship between an input image obtained by deleting margins and a sheet size.
Figure 7B:
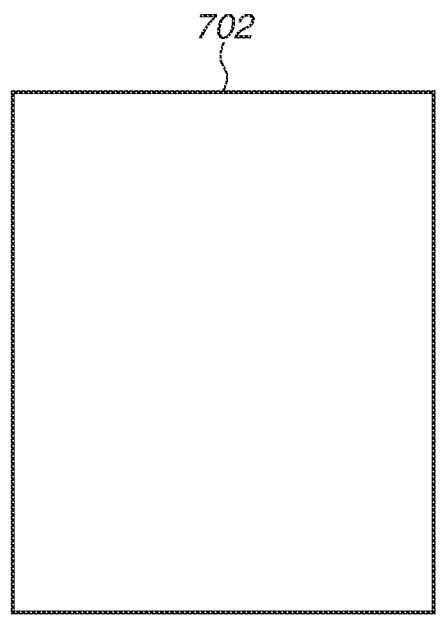
Figure 7C:
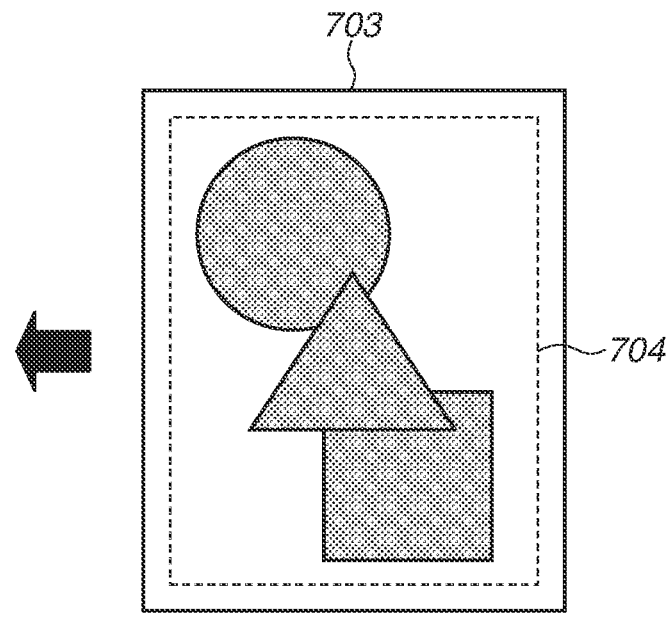

FIGS. 7A, 7B, and 7C are diagrams illustrating a relationship between an input image obtained by deleting margins and a sheet size. The image forming apparatus 101 receives rasterized image data from the external controller 102 via the video cable 106. An image forming apparatus used in the printing system having the configuration in which an external controller is connected to the printing system is in many cases a high-speed machine, and thus, the input speed of image data also influences the throughput of the printing system. Thus, to reduce the data size of the image data as much as possible, there is also a configuration in which the external controller 102 transmits the image data to the image forming apparatus 101 by deleting an image corresponding to a margin that is not to be printed by the image forming apparatus 101. More specifically, the external controller 102 transmits only an image inside the dashed line 602 in FIG. 6 as the image data to the image forming apparatus 101.

FIG. 7A is an example of image data in a case where an image corresponding to the margin is deleted. The sheet size of a sheet on which printing is to be actually performed is an A4 sheet size, which is illustrated as a sheet size 702 in FIG. 7B, but image data received from the external controller 102 is an image 701, which is an image inside the dashed line 602 in FIG. 6, and is an image smaller than the A4 sheet size. The CPU 222 reserves memory for the A4 sheet size in the memory 223, and centers and lays out the image data corresponding to the image 701, thereby generating an image corresponding to the A4 sheet size. The image forming apparatus 101 prints the laid out image corresponding to the A4 size, thereby resulting in print output illustrated in FIG. 7C. A print product 703 is an A4 sheet, and the image data on the image 701 is centered and printed in an area 704. In the present exemplary embodiment, since the margins have the same width on the top, bottom, left, and right, the image is printed by centering the image. If, however, the margin is not uniform, the image may be printed by shifting the image based on the margins.

Figure 8A:
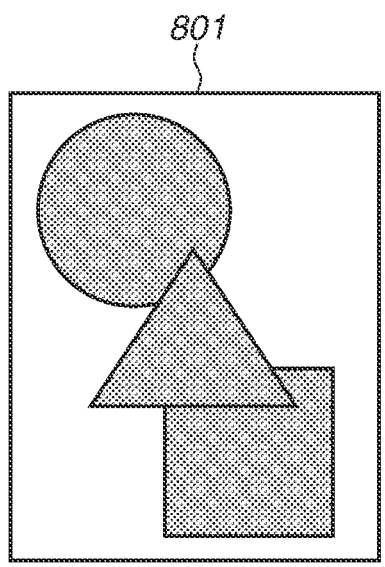
FIGS. 8A, 8B, and 8C are diagrams illustrating a relationship between the input image and the sheet size in a case where a sheet size different from an image size of an input image is specified.
Figure 8B:
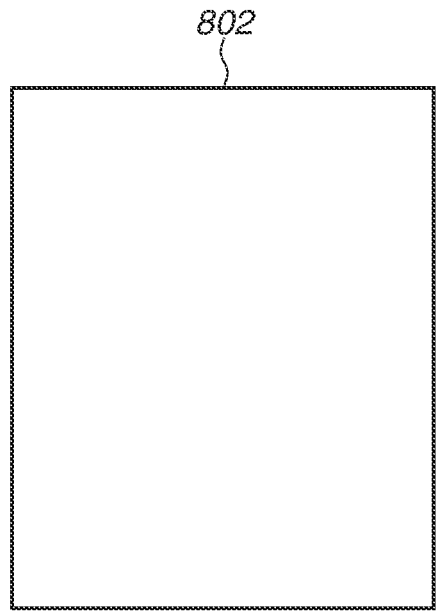
Figure 8C:
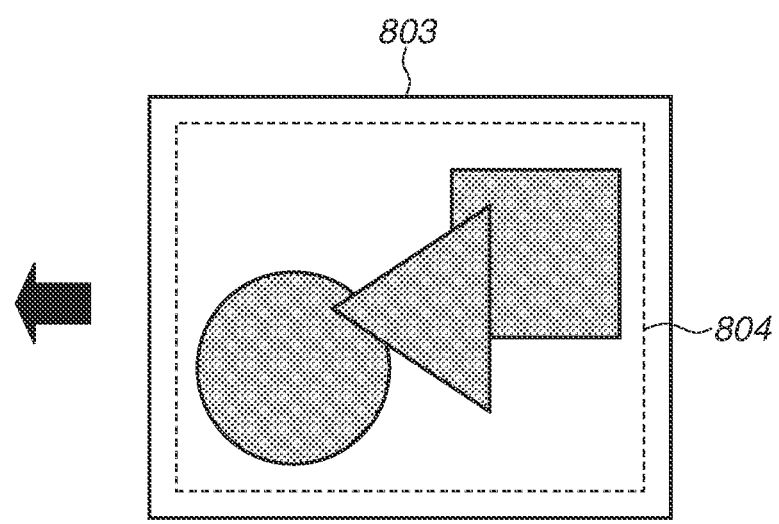

FIGS. 8A, 8B, and 8C are diagrams illustrating the relationship between the input image and the sheet size in a case where a sheet size different from the image size of an input image is specified. Similarly to FIGS. 7A, 7B, and 7C, FIG. 8A illustrates image data received from the external controller 102, FIG. 8B illustrates the size of a sheet on which printed is to be performed, and FIG. 8C illustrates print output.

In FIGS. 8A, 8B, and 8C, image data corresponding to the margins is not deleted from the image data received from the external controller 102.

FIGS. 8A, 8B, and 8C illustrate an example where image data having an aspect ratio different from that of a sheet to be subjected to print output is printed. In a print job, a sheet on which printing is to be performed can be specified with respect to each image, and a sheet size different from an image size can also be specified. A sheet size 802 corresponds to a sheet of an A3 sheet size, and an image 801 having an aspect ratio different from that of the A3 size is printed thereon.

The CPU 222 reserves memory for the A3 sheet size in the memory 223, and centers and lays out image data corresponding to the image 801, thereby generating an image corresponding to the A3 sheet size. The image forming apparatus 101 can feed an A3 sheet only from the short side, and thus, in a case where printing is performed, the orientation of the sheet is the orientation of a print product 803, and the sheet is fed in the direction of an arrow, or from the short side.

Thus, the CPU 222 rotates the laid out image corresponding to the A3 size by −90 degrees and prints the image, thereby resulting in print output illustrated in FIG. 8C in which the data of the image 801 is rotated and centered on a horizontally long A3 sheet as illustrated in an image 804. As a matter of course, the image may be laid out not by centering the image, but by shifting the image to any side.

FIG. 9 is a flowchart illustrating the procedure of the creation and the registration of a reference image. A program for the image forming apparatus 101 with respect to the flowchart is stored in the HDD 221, loaded into the memory 223, and executed by the CPU 222.

In step S901, the image forming apparatus 101 reads page data of the print job. The page data includes image data and information such as the image size of the page, the sheet size of a sheet on which printing is to be performed, the resolution, and the orientation of the image.

In step S902, the image forming apparatus 101 compares the long sides of the image size and the sheet size included in the page data read in step S901 and also compares the short sides of the image size and the sheet size, thereby determining whether the image size and the sheet size are the same size.

If the image size and the sheet size are the same size (YES in step S902), the processing proceeds to step S907. If the image size and the sheet size are different sizes (NO in step S902), the processing proceeds to step S903. In step S903, depending on whether the image data is vertically long or horizontally long relative to a vertically long sheet, the image forming apparatus 101 determines whether the image needs to be rotated according to orientation of the sheet. In a case where the sheet is vertically long and the image data is horizontally long, the image needs to be rotated.

Figure 10A:
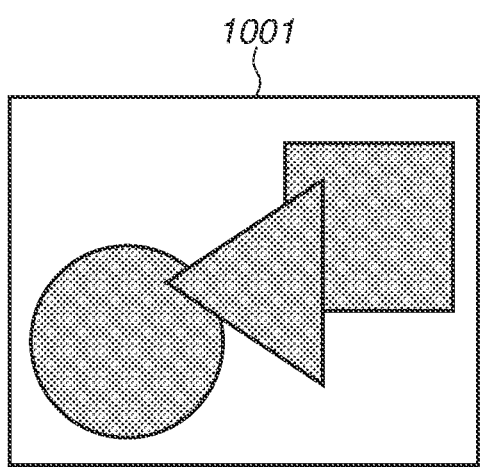
FIGS. 10A and 10B are diagrams illustrating a difference in orientation between image data and a sheet.
Figure 10B:
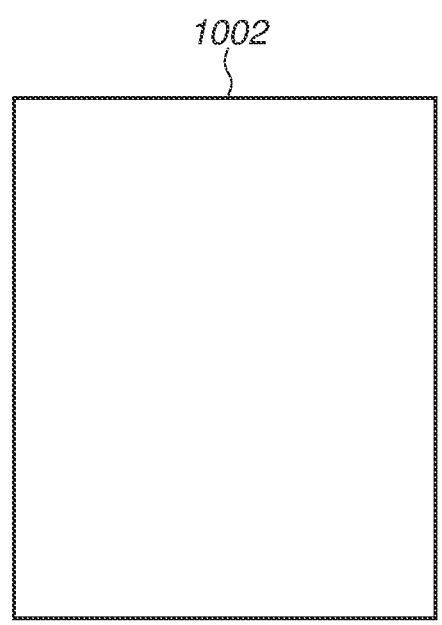

For example, in a case where FIG. 10A illustrates the image data and FIG. 10B illustrates the sheet size, an image 1001 is horizontally long and thus is fitted to a sheet size 1002 by rotating the image 1001 by 90 degrees. If it is determined in step S903 that the image needs to be rotated (YES in step S903), the processing proceeds to step S904. If it is determined that the image does not need to be rotated (NO in step S903), the processing proceeds to step S905.

In step S904, the image forming apparatus 101 rotates the image to fit the sheet. In step S905, the image forming apparatus 101 creates white image data corresponding to the sheet size on the memory 223. At this time, the white image data is created on the assumption of a configuration in which a white sheet is used. However, any image data corresponding to the sheet may be created. Specifically, in a case where a sheet on which a background image is printed is used as a print medium, background image data is created. In a case where colored paper is used as a print medium, color image data corresponding to the sheet is created.

In step S906, the image forming apparatus 101 combines the white image data created on the memory 223 and the image data. In the present exemplary embodiment, as described with reference to FIGS. 7A, 7B, and 7C and FIGS. 8A, 8B, and 8C, the image data is laid out by centering the image data on the sheet. As a matter of course, the image data may be laid out not by centering the image data, but by shifting the image data to any side of the sheet.

In step S907, the image forming apparatus 101 determines the orientation of the image when the image data corresponding to the sheet size is to be actually printed. The sheet size is based on a vertically long sheet. However, for example, as illustrated in FIGS. 8A, 8B, and 8C, an A3 sheet can be fed only from the short side, and thus, the image needs to be rotated. Moreover, in a case where finishing such as stapling or hole punching is to be performed, the finishing can be performed only in a certain direction due to the mechanical configuration. Thus, the finishing is performed by matching the orientations of the sheet and the image to be printed. Also taking the finishing into account, the image forming apparatus 101 ultimately determines the orientation of the image to be printed on the sheet and determines the final rotational angle of the image data.

In step S908, the image forming apparatus 101 determines whether the image needs to be rotated by the final rotational angle. If the image needs to be rotated (YES in step S908), the processing proceeds to step S909. If the image does not need to be rotated (NO in step S908), the processing proceeds to step S910. In step S909, the image forming apparatus 101 rotates the image data according to the final rotational angle. In step S910, the image forming apparatus 101 transmits the image data to the product inspection apparatus 109 via the communication cable 254, and the product inspection apparatus 109 registers the image data as a reference image in the memory 239. In step S911, the image forming apparatus 101 determines whether the page processed in steps S901 to S910 is the last page. If the page is not the last page (NO in step S911), the processing returns to step S901. If the page is the last page (YES in step S911), the processing ends.

FIGS. 10A and 10B are diagrams illustrating a difference in orientation between the image data and the sheet. FIG. 10A illustrates the image data, and FIG. 10B illustrates the sheet size. The image 1001 illustrates a horizontally long image, and the sheet size 1002 illustrates a vertically long sheet. FIGS. 10A and 10B illustrate an example where the orientations of the image 1001 and the sheet size 1002 are different by 90 degrees.

The above processing is performed, whereby, even in a case where the image size and the sheet size of a print job are different, the image forming apparatus 101 can lay out an image corresponding to the sheet size of a sheet on which printing is to be performed according to the direction of printing, and register the laid out image as a reference image in the product inspection apparatus 109. With the configuration according to the present exemplary embodiment, it is possible to perform proper inspection without the user performing the processing of outputting a print product and scanning the output print product.

In the present exemplary embodiment, a case has been described where the image size is smaller than the sheet size. However, even in a case where the image size is larger than the sheet size, a reference image is created by laying out an image similarly to when the image is to be printed, whereby it is possible to perform proper inspection.

While various examples and exemplary embodiments of the present disclosure have been described above, the spirit and scope of the present disclosure are not limited to a particular description in the specification.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-030075, filed Feb. 26, 2021, which is hereby incorporated by reference herein in its entirety.

What is claimed is:

1. An image inspection system including a printing apparatus and an inspection apparatus,
   wherein the printing apparatus is configured to print a print image on a print medium based on a print setting, generate a reference image by layout processing on the print image, and transmit the generated reference image to the inspection apparatus, the printing apparatus including first one or more first processors,
   wherein the inspection apparatus is configured to determine whether the print image is defective based on the reference image and an image obtained by reading the print image printed on the print medium, the inspection apparatus including one or more second processors,
   wherein the inspection apparatus determines that the reference image and the print image printed on the print medium are different, thereby determining that the print medium is defective, and
   wherein the inspection apparatus determines that the reference image and the print image printed on the print medium are the same, thereby determining that the print medium is normal.

2. The image inspection system according to claim 1,
wherein the printing apparatus receives a setting instruction to set the reference image, and
wherein, in a case where the printing apparatus receives the setting instruction, the inspection apparatus stores the print image subjected to the layout processing as the reference image in a storage device.

3. The image inspection system according to claim 1, wherein the layout processing includes processing of rotating the print image according to orientation of the print medium used by the printing apparatus.

4. The image inspection system according to claim 1, wherein the layout processing includes processing of generating print data corresponding to the print medium based on a setting of a sheet size set in the print setting.

5. The image inspection system according to claim 4, wherein the layout processing includes processing of combining the print image subjected to the layout processing with the print data corresponding to the print medium.

6. The image inspection system according to claim 4, wherein the print data corresponding to the print medium is white image data.

7. The image inspection system according to claim 1, wherein the layout processing is executed with respect to each piece of page data.

8. The image inspection system according to claim 1, wherein the print image used in the layout processing is raster data.

9. The image inspection system according to claim 1, wherein the printing apparatus receives the print image from an external apparatus.

10. The image inspection system according to claim 1, wherein the printing apparatus generates the print image based on a print job received from an external apparatus.

11. A control method for an image inspection system including a printing apparatus and an inspection apparatus, the control method comprising:
    printing a print image on a print medium based on a print setting;
    generating a reference image by layout processing on the print image;
    transmitting the generated reference image to the inspection apparatus; and
    determining whether the print image is defective based on the reference image and an image obtained by reading the print image printed on the print medium,
    wherein the inspection apparatus determines that the reference image and the print image printed on the print medium are different, thereby determining that the print medium is defective, and
    wherein the inspection apparatus determines that the reference image and the print image printed on the print medium are the same, thereby determining that the print medium is normal.

12. An image inspection system including a printing apparatus and an inspection apparatus, the image inspection system comprising:
    one or more controllers including one or more processors and one or more memories, the one or more controllers being configured to:
        print a print image on a print medium based on a print setting;
        generate a reference image by layout processing on the print image;
        store the generated reference image in the one or more memories; and
        determine whether the print image is defective based on the stored reference image and an image obtained by reading the print image printed on the print medium,
    wherein the one or more controllers determine that the reference image and the print image printed on the print medium are different, thereby determining that the print medium is defective, and
    wherein the one or more controllers determine that the reference image and the print image printed on the print medium are the same, thereby determining that the print medium is normal.

13. The image inspection system according to claim 12, wherein the printing apparatus receives the print image from an external apparatus.

14. The image inspection system according to claim 12, wherein the printing apparatus generates the print image based on a print job received from an external apparatus.

15. The image inspection system according to claim 12, wherein the layout processing includes processing of rotating the print image according to orientation of the print medium used by the printing apparatus.

16. The image inspection system according to claim 12, wherein the layout processing includes processing of generating print data corresponding to the print medium based on a setting of a sheet size set in the print setting.

17. The image inspection system according to claim 12, wherein the layout processing is processing of combining white image data with the print image.

18. The image inspection system according to claim 1, wherein the layout processing is processing of combining white image data with the print image.

19. An image inspection system including a printing apparatus and an inspection apparatus,
    wherein the printing apparatus is configured to print a print image on a print medium based on a print setting, generate a reference image by adjusting the print image in a page and making a margin around the print image, and transmit the generated reference image to the inspection apparatus, the printing apparatus including one or more first processors,
    wherein the inspection apparatus is configured to determine whether the print image is defective based on the reference image and an image obtained by reading the print image printed on the print medium, the inspection apparatus including one or more second processors,
    wherein the inspection apparatus determines that the reference image and the print image printed on the print medium are different, thereby determining that the print medium is defective, and
    wherein the inspection apparatus determines that the reference image and the print image printed on the print medium are the same, thereby determining that the print medium is normal.

\* \* \* \* \*